United States Patent [19]

Hartman

[11] 4,045,386
[45] Aug. 30, 1977

[54] ALKALI-TREATED BARK EXTENDED TANNIN-ALDEHYDE RESINOUS ADHESIVES

[75] Inventor: Seymour Hartman, Mahopac, N.Y.

[73] Assignee: Champion International Corporation, Stamford, Conn.

[21] Appl. No.: 633,235

[22] Filed: Nov. 19, 1975

Related U.S. Application Data

[63] Continuation-in-part of Ser. No. 574,036, May 2, 1975, abandoned.

[51] Int. Cl.$^2$ .............................................. C08L 1/02
[52] U.S. Cl. ................................. 260/17.2; 428/528
[58] Field of Search ......................................... 260/17.2

[56] References Cited

U.S. PATENT DOCUMENTS

| 2,926,146 | 2/1960 | McCully | 260/9 |
| 2,930,772 | 3/1960 | Williams et al. | 260/17.2 |
| 3,025,250 | 3/1962 | Herrick et al. | 260/17.2 |

FOREIGN PATENT DOCUMENTS

| 927,454 | 5/1963 | United Kingdom | 260/29.3 |

OTHER PUBLICATIONS

*Pulp and Paper Magazine of Canada,* "Bark Extracts . . . in Adhesives", MacLean et al., Aug. 1952, pp. 111-114.
Chem. Absts. vol. 55; 10885i, Herzberg, "*Pinus radiata* Tannin-Formaldehyde Resin as an Adhesive for Plywood."
Chem. Absts. vol. 66; 96389v, Plomley, "Tannin-Formaldehyde Adhesives."
*Phenolic Resins,* Whitehouse et al., 1967, p. 75.

*Primary Examiner*—Edward M. Woodberry
*Attorney, Agent, or Firm*—Evelyn M. Sommer

[57] ABSTRACT

Bark-extended tannin-aldehyde resinous adhesives are formed in situ as adhesives for wood products, such as plywood. Bark, in a finely divided particle form, is treated with alkali and then used as an extender by admixing the bark particles with tannin and an aldehyde co-reactant therefor. The admixture is combined as a bonding agent for the wood members to be adhered, and is formed in situ into an adhesive by subjecting the wood members to temperature and pressure conditions effective to form a bark-tannin-aldehyde resin.

11 Claims, No Drawings

ALKALI-TREATED BARK EXTENDED TANNIN-ALDEHYDE RESINOUS ADHESIVES

This application is a continuation-in-part of application Ser. No. 574,036 filed May 2, 1975 and now abandoned.

DESCRIPTION OF THE INVENTION

This invention relates to resinous adhesive compositions that are wholly derived from trees. More particularly this invention relates to a back-extended tannin-aldehyde adhesive composition which is formed into an adhesive, in situ, while applied to wood members to be adhered.

Various resinous adhesives have been utilized to prepare plywood boards, wood particleboards, hardwood boards and the like. Thermosetting phenol-formaldehyde condensation products have been extensively used as adhesives in the production of composite wood products. As a means of improving the quality of adhesives while reducing their cost in order to improve the economics of plywood production and the like, the use of so-called "extenders" has been proposed. Thus, one proposal involves the use of alkali-treated slurries of finely divided bark to increase the spreading power of the thermosetting phenol-formaldehyde resin to which they are added. Another proposal involves the use of an alkali-bark derivative as an extender, which material is obtained by treating bark, such as coniferous barks, with an aqueous solution of a suitable alkaline compound for several hours, usually under high temperatures and pressures, in order to extract various compounds from the bark. The resulting solution is then filtered and spray-dried to provide an alkali bark powder that is water-soluble and is reactive with a phenol-formaldehyde resin system. Such systems are relatively expensive to operate and involve the use of a phenol-formaldehyde condensation product.

A resinous adhesive system has now been discovered having components that are wholly derived from trees, and which is formed in situ during the manufacture of adhesively bonded wood products utilizing such adhesive system.

Surprisingly, it has been discovered that a tree-derived resinous adhesive composition can be provided by admixing a finely divided, alkali-treated wood bark, tannin and an adehyde. The resulting admixture is subjected to condensation conditions to form a reactive bark-extended tannin-aldehyde resinous adhesive. Thus, in the case of the formation of plywood, the alkali-treated bark, tannin and aldehyde admixture may be applied to the surface of a plurality of wood plies, which are thereafter pressed under conventional temperature and pressure conditions in order to form a laminate. Under such conditions, the bark, tannin and aldehyde are caused to condense, in situ, and form a bark-extended tannin-aldehyde resinous adhesive.

Wood bark of various different species of trees may be utilized, however, the bark of coniferous trees is preferred. Thus, for example, bark from various pines may be employed, such as southern pine, Ponderosa pine, sugar pine, slash pine, loblolly pine, short leaf pine, long leaf pine and white pine. Likewise, the barks of western hemlock, Douglas fir, oak, western white fir, Sitka spruce, coast redwood, eastern hemlock, and the like may be employed. The bark prior to use is reduced to a powder, having a particle size of 60-200 mesh and preferably 100 mesh. The term "tannin", as employed in the specification and claims, is intended to mean the plant tannins which may be obtained, for example, from the bark of trees by crushing the bark into small pieces and then washing and boiling the bark with water in order to extract the tannin. After the separation of insoluble matter, a resulting thick, reddish, brown, viscous extract is evaporated, leaving crude tannin as a hard cake. The cake may then be purified by extracting with an alcohol-ether mixture.

Tannins are generally divided into two classifiable types: (1) condensed tannins that cannot be hydrolyzed either by acids or enzymes (there include the acacatechin and isoacacatechin tannins and the gambier catechin tannins; all containing highly-substituted phloroglucinol nuclei; (2) hydrolyzable tannins, for example, gallotannins, ellagitannins, and caffetannins. Examples of the gallotannins include: tannic acid or Chinese Tannin; Turkish Tnnin; Hamamelis Tannin; Acer-tannin; Glucogellin; Sumac tannin; Valonia oak gall tannin; tea tannin; Tara; Myrabolam; Divi-Divi; Algarobillo; oak; and chestnut. Also useful are the flavotannins including Gambier and Catechu or Burma Cutch; Quebraco; Tizerah; Urunday; Wattle; Mangrove; Spruce; Hemlock; Larch; Willow; and Avaram. The source or origin of the tannins is well known to the artisan. Thus for instance the Mangrove tannins are derived from Rhizophora micronata and Quebracho tannin from Schinopsis lorentzu.

Wattle tannin is a preferred tannin for use in the practice of the invention. Wattle tannin is extracted from the bark of the Acacia mollissima tree with water. The conventional method of preparing wattle is to disintegrate the wood and bark, extract the bark and/or wood with water. The solution of wattle tannin and water is evaporated to 85 percent concentration and the concentrated wattle tannin is spray dried. Wattle tannin is the commercial catechol tannin or flavotannin product. The high tannin content of the wood of the Acacia tree makes it the important source of catechol tannins.

The commercial wattle tannin powder used had the following analysis:

| | | |
|---|---|---|
| Tannin | — | 70.05% |
| Non-Tannin | — | 23.31% |
| Soluble Solids | — | 93.36% |
| Moisture | — | 5.54% |
| Insolubles | — | 1.09% |

The term "aldehyde" as used herein includes formaldehyde, furfuraldehyde paraformaldehyde and the like. Paraformaldehyde is the preferred aldehyde.

Suitable additives that may be added include wood or wheat flour, soda ash, borax and sodium carbonate. Such additives are added in amounts of between 0.5 and about 5% by weight upon the weight of the bark-tannin-aldehyde resin formed.

The alkali used to treat the bark is preferably sodium or potassium hydroxide. However there can also be used other alkali materials such as calcium oxide, magnesium oxide, sodium bicarbonate and the like. The alkali for instance sodium hydroxide (50%) is used in an amount of 20-40% with respect to the bark. The preferred amount of alkali would be 20-30% based on the bark used.

Acids which can be advantageously used for neutralizing the alkali bark preparation include both inorganic and organic acids such as phosphoric, hydrochloric, sulfuric, nitric, formic and acetic acids. The neutralization of the alkali bark preparation is carried out to provide a pH in the range of about 5 to about 7.0.

Suitable amounts of paraformaldehyde added to the weight of the bark-tannin composite is between 3 and about 8 percent.

The amount of finely divided bark of particles of 80 to 200 mesh, preferred size being 100 mesh, utilized is in the range of between about 10 and about 50, preferably between about 15 and 30 percent by weight of the tannin-aldehyde resin.

A preferred procedure for the preparation of the bark component of the instant tannin-aldehyde adhesive system involves initially adding pine bark powder comprised of particles of 100 mesh or smaller into a mixer. The amount added is 10 to 25% by weight of the adhesive system. Next, a 50% aqueous solution of an alkali, preferably sodium hydroxide in an amount of 20 to 40% by weight of the bark powder is added to the bark powder. The alkali has a concentration in the range of between about 30 and about 70 percent. An exotherm ensues. Water is then added in the amount of about two times the weight of the bark. This alkali bark preparation is then neutralized with acid such as an inorganic acid for instance phosphoric acid, sulfuric acid or an organic acid for instance formic or acetic acid, to provide a pH in the range of 5 to 7. This neutralization is very important because an alkali bark addition to the tannin solution as thereafter takes place, would coagulate or congeal the tannin solution. Thus, it is necessary to neutralize or preferably to adjust the pH to the acid side i.e., a preferred pH would be in range of 5.5-7. It has also been found that when acetic acid is used to adjust the pH of the alkali bark component of the adhesive, the percent wood failure of the shear samples is far superior than the percent wood failure which reslts with other acids. There is added to the thusly prepared bark mixture an equal amount of 50% tannin solution and the required amount of paraformaldehyde and wheat flour. A preferred ratio of tannin solution to paraformaldehyde is 10:1. The preferred amount of wheat flour is 10% of the tannins used. The mixture is agitated for about 30 minutes to 1 hour with the resultant formation of a homogeneous adhesive.

The resulting adhesive precursor is then introduced into a conventional plywood glue spreader and applied to the core material at a spread of 60 to 85 pounds per thousand square feet. Veneers are placed over and below the core and the panels are placed into a press wherein they are subjected to a pressure of between about 160 and about 190 pounds per square inch, preferably 180 psi., while at a temperature in the range of between about 250° and about 280° F., preferably 280° F, for a time period of between about 3 and about 7 minutes, preferably 5 or 6 minutes.

The finished panel is withdrawn from the press with the alkali bark-extended tannin-aldehyde adhesive securely bonding the wood plies together.

It has also been found that by incorporating powdered resorcinol into the adhesive in an amount of from 4 to 10 percent of the tannin solids used, that the shear values as well as the percent wood failure increases.

The present invention may be more fully understood by the following examples:

EXAMPLE NO. 1

350 Grams of Ponderosa pine bark (100 mesh) is admixed with 200 grams (50%) sodium hydroxide. An exothermic reaction develops. Enough water is slowly added to begin the leaching process, the exotherm continues for several minutes. As the exotherm diminishes, more water is added to a total of 750 grams. The pH of this akali bark slurry is adjusted to between 5.5 and 7, preferred pH about 6.1.

1000 grams of above pH adjusted alkali bark is added under stirring to 1000 grams of wattle tannin solution (50%). To the resultant homogeneous blend there is added 100 grams paraformaldehyde (catalyst). The ratio of paraformaldehyde to tannin (50%) solution amounts to 1:10. The paraformaldehyde is used at a preferred range of 5% of the tannin solution (50%). The broad range is from 3 to 10%.

The resulting admixture is used as the adhesive precursor in preparing plywood panels. The adhesive precursor is spread on both sides of the core of a three ply panel at a rate of 60-85 lbs/1000 sq. ft. The panel is placed in a press held at a temperature of 280° F (range 250°-280° F) while at a pressure of 180 psi (range 160-180) for a period of 6 minutes (range 4-7 min.).

EXAMPLE NO. 2

500 Parts of a pH adjusted alkali bark mixture (Example 1) was added to 1000 parts of 50% solution of wattle tannin. To this was added under agitation, 50 parts wheat flour and 50 parts paraformaldehyde. Plywood panels were prepared under the same conditions Example 1. Shear specimens were run on the prepared plywood samples. The results are given below:

TABLE I

| Adhesive | Press Conditions | | | Strength Shear | V/P % Wood Failure |
|---|---|---|---|---|---|
| | Temp. | psi. | Time (min.) | | |
| Example 1 | 280 | 180 | 6 | 190 | 80 |
| Example 2 | 280 | 180 | 6 | 220 | 85 |

V = Vacuum
P = Pressure

EXAMPLE NO. 3

500 Parts of alkali bark mixture (Example 1) was adjusted with acetic acid to a pH of 6. There were added to this preparation 1000 parts of 50% solution of wattle tannin under agitation and 50 parts of wheat flour and 70 parts of paraformaldehyde. Plywood panels were prepared as in Example 1.

Shear specimens were run on the prepared plywood samples. The results are set out in Table I.

EXAMPLE NO. 4

The procedure of Example 3 was repeated with alkali bark adjusted to pH of 5.8 with formic acid. To the final adhesive under agitation, 30 grams of powdered resorcinol were added. Plywood panels were prepared under the same conditions as set out in Example 1.

Shear specimens were run on the prepared plywood samples. The results are set out below in Table I.

TABLE II

| Adhesive | Press Conditions | | | Strength Shear | V/P % Wood Failure |
|---|---|---|---|---|---|
| | Temp. | psi | Time (min.) | | |
| Example 3 | 280 | 180 | 6.5 | 230 | 92.6 |

TABLE II-continued

| Adhesive | Temp. | Press Conditions psi | Time (min.) | Strength Shear | V/P % Wood Failure |
|---|---|---|---|---|---|
| Example 4 | 280 | 180 | 6.5 | 300 | 88 |

V = Vacuum
P = Pressure

From the foregoing, it is seen that an alkali bark-extended tannin formaldehyde adhesive is produced in situ under conditions effective to cause the condensation of the tannin and aldehyde. Thus, the adhesive of the present invention not only eliminates the need for conventional resinous components, such as phenol, which are in short supply from time to time, but permits the greater utilization of three extracts and three components, as all of the major ingredients of the present adhesive may be derived from trees. Moreover, the process of the present invention requires no special equipment, handling procedures, or expensive additives as required in previously proposed adhesive.

Although the invention has been described in considerable detail with particular reference to certain preferred embodiments thereof, variations and modifications can be effected within the spirit and scope of the invention as described hereinbefore, and as defined in the appended claims.

What is claimed is:

1. A tree-derived adhesive composition, which comprises the reaction product of an admixture of an alkali-bark pre-mix, tannin and aldehyde, said alkali-bark pre-mix being a mixture of finely divided bark particles, alkali, and water, said pre-mix being neutralized with acid to a pH in the range of approximately 5.5 to 7 pH prior to the addition of the tannin and aldehyde, said admixture of said alkali-bark pre-mix, tannin, and aldehyde occurring without an application of external heat.

2. The composition of claim 1 wherein said aldehyde is paraformaldehyde.

3. The composition of claim 1 wherein said alkali is sodium hydroxide.

4. The composition of claim 1 where in the ratio of tannin to aldehyde is in the range of between about 10 tannin to between about 1 and 10 aldehyde.

5. The composition of claim 1 where in said finely-divided wood bark has a particle size in the range of between about 80 and 200 mesh size.

6. A process for preparing a tree-derived adhesive composition comprising the steps of:
   preparing an alkali-bark pre-mix by admixing finely-divided wood bark and alkali, said admixture creating an exotherm; and
   slowly adding water to said admixture as the exotherm continues;
   neutralizing said pre-mix with acid to a pH in the range of approximately 5.5-7 pH;
   adding to said neutralized pre-mix, tannin and aldehyde; and
   agitating said pre-mix — tannin aldehyde mixture until a homogeneous blend is formed;
   said adhesive composition being prepared without the application of external heat.

7. The process of claim 6 wherein said alkali is sodium hydroxide and said aldehyde is paraformaldehyde.

8. A process for preparing a tree-derived adhesive composition as recited in claim 6 further comprising the step of adding a neutral additive such as wheat flour to the neutralized pre-mix, tannin, and aldehyde.

9. The composition of claim 1 wherein said tannin comprises wattle tannin.

10. The composition of claim 4, which contains between 10 and 50% bark by weight of tannin-aldehyde resin.

11. The composition of claim 1, which additionally contains resorcinol in an amount between 4 to 10% of the tannin solids.

* * * * *